United States Patent [19]

Kobayashi

[11] Patent Number: 5,021,110

[45] Date of Patent: Jun. 4, 1991

[54] PROCESS FOR MANUFACTURING SELF-ADHESIVE MULTILAYERED LABEL

[75] Inventor: Junichi Kobayashi, Tokyo, Japan

[73] Assignee: Ko-pack Corporation, Tokyo, Japan

[21] Appl. No.: 439,280

[22] Filed: Nov. 20, 1989

[51] Int. Cl.$^{5}$ .............................................. B32B 31/18

[52] U.S. Cl. .................................... 156/249; 156/259; 156/260; 156/264; 156/267; 156/268; 40/306; 40/310; 283/81; 283/103; 428/40

[58] Field of Search ............... 156/259, 260, 249, 264, 156/271, 512, 267, 268; 283/81, 103; 40/306, 310; 428/40

[56] References Cited

U.S. PATENT DOCUMENTS

| | | | |
|---|---|---|---|
| 1,896,834 | 2/1933 | Brown | 283/81 |
| 3,655,476 | 4/1972 | Siegal | 156/260 |
| 3,755,934 | 9/1973 | Porcher et al. | 283/81 |
| 4,277,089 | 7/1981 | Lockhart | 283/81 |
| 4,323,608 | 4/1982 | Denny et al. | 40/306 |
| 4,359,358 | 11/1982 | Hattemer | 156/264 |

FOREIGN PATENT DOCUMENTS

| | | | |
|---|---|---|---|
| 60-134276 | 7/1985 | Japan . | |
| 60-165686 | 8/1985 | Japan . | |
| 61-114842 | 6/1986 | Japan . | |
| 61-255381 | 11/1986 | Japan . | |
| 2125335 | 3/1984 | United Kingdom | 156/512 |

*Primary Examiner*—Caleb Weston
*Attorney, Agent, or Firm*—Frishauf, Holtz, Goodman & Woodward

[57] ABSTRACT

A process for preparing self-adhesive multilayered labels which comprises the steps of printing main and supplementary label messages on a label stock simultaneously by a label printer, cutting the label stock thus printed into halves, and then superimposing the halves of the label stock thus cut in a manner so that the face paper carrying the supplementary label message is releasably superimposed on and in alignment with the face paper carrying the main label message. After printing the main and supplementary label messages simultaneously in two parallel rows, the label stock is cut lengthwise into halves. One half of the label stock is peeled off its release paper and its face paper alone is forwarded on the conveyer line. The other half of the label stock is forwarded on the conveyer line together with its release paper. Either the face paper without the release paper or the other face paper with the release paper is adjusted of its feed track on the conveyer line so that the face papers may be put together in alignment to form a final product label stock.

12 Claims, 2 Drawing Sheets

PROCESS FOR MANUFACTURING SELF-ADHESIVE MULTILAYERED LABEL

BACKGROUND OF THE INVENTION AND RELATED ART STATEMENT

The present invention relates to a process for manufacturing self-adhesive multilayered label stock. More particularly, the self-adhesive multilayered label stock according to the present invention is a combination of a face paper with a release paper and printed with a main label message to be attached directly to goods or containers therefor and a face paper without a release paper and printed with a supplementary label message which is releasably placed on said face paper printed with the main message. The supplementary label message may be graphics or letters that are the same as those in the main message.

As one form of a prior art label to be attached to the surface of goods or the containers therefor, a self-adhesive label is well known. The prior art label stock includes a release paper and a face paper which is superimposed on the release paper and printed with label messages. The label stock may be punch-pressed together with the release paper into a given contour framing the label message, so that the user may peel off the punch-pressed frames of message and attach the same on the goods.

Further in the prior art, as disclosed in U.S. Pat. Nos. 1,896,834 and 4,323,608, there are known self-adhesive multilayered labels which, utilizing the advantages of said self-adhesive label and for the purpose of the advertizing function, include extra layers that are superimposed on the original label and carry description of the goods or a function like coupons. A typical construction of a self-adhesive label of this type includes a main label to be attached directly to goods, and supplementary label which is releasably pasted on the main label and printed as a coupon on its back and with the same graphics, etc. as the main label on its top face. A consumer may easily peel the supplementary label off the main label upon purchase and use the same as a coupon. As the main label is still attached on the goods, the consumer can tell the contents or confirm the manufacturer.

An essential challenge in preparing a self-adhesive multilayered label having the above construction is how the supplementary label carrying a label message of graphics, etc. which is similar to that on the main label should be superimposed on the main label while the main label is being printed with a label message. Supposing that the supplementary label is to be superimposed on the main label at the final stage of the production process, it is preferable that both the main and the supplementary labels are printed with label messages of graphics, etc. simultaneously at the same process step. However, since the label stock on which the main message is to be printed and the face paper on which the supplementary label message is to be printed are not the same but are separate sheets of paper. In order to print the label stock and the face paper simultaneously in one production system, it is necessary to provide two separate printers, making the size of system large and pushing up the production cost of the label.

In the prior art, due to the above reason, printing of the supplementary label message was not conducted at the step of printing graphic and other label message on the face paper of the label stock. Instead, it has been the practice to print on a sheet of plain paper supplementary label message which is similar to that of main label message before the step of printing the main label message. The plain paper printed with the supplementary label message is wound into a roll and stored until the time when it is supplied to the production line to be placed over the label stock carrying the main label message at a predetermined position. This inevitably necessitated the main and supplementary label messages to be printed separately. As the plain paper printed with the supplementary label message in advance is supplied at the time when the label stock is to be printed with the main label message, the entire production process needs long time to deteriorate efficiency.

SUMMARY OF THE INVENTION

The present invention aims at providing an efficient manufacturing process for self-adhesive multilayered label wherein the main and the supplementary label messages can be printed simultaneously by the same printer device in the production system, and that two label stocks carrying said respective label messages are put together on the conveyer line immediately after the printing step. In this manner, multilayered label can be prepared in one process.

The process according to the present invention includes the following steps as concrete means to achieve the aforementioned objective. A label stock with predetermined width enough to print both the main and supplementary label messages in parallel to each other is supplied into the production line and conveyed toward a printer. The label stock is printed with plural label messages in a parallel arrangement with respect to the direction of the width of the label stock. Said label stock carrying plural label messages in parallel arrangement is cut into halves along the longitudinal direction while being conveyed over the conveyer line. One half of the cut label stock is then peeled from its release paper on the back, and the face paper alone will be sent forward while the release paper is being dicarded. In the meantime, the other half of the label stock will be conveyed over the conveyer line to keep the same track with the first half which is stripped of its release paper. A feed track adjustment means is provided on the conveyer line to adjust the track of the second half of the label stock and to align the same with the first half. The face paper without the release paper on the back is superimposed over and bonded with the face paper of the second half of the label stock with its release paper in such a manner that the printed label messages on both face papers will align with each other. The outline contour for the label messages on both of the face papers will be punch-pressed on the release paper so that the, blank portions on the release paper surrounding the label messages may be peeled off and removed.

The major object of the present invention process for preparing multilayered self-adhesive labels can be achieved by following the steps mentioned above. However, multilayered self-adhesive labels of different modes can be obtained by adding extra steps to the process mentioned above.

As mentioned above with respect to the basic process, label messages are first printed on the face paper of a label stock by a printer. The label stock printed with label messages on its face paper is cut into two in the longitudinal direction. One half of the label stock is peeled off from its release paper on the back and is thus left with the face paper alone, which will subsequently be superimposed on and bonded with the other half of the label stock still having its release paper on the back. The face paper of the label stock whose release paper is peeled off therefore has back surface having no message thereon when it is superimposed on the other half of the label stock. To leave such a blank space is quite wasteful, as the blank space can very well be used for printing messages, instructions, etc. for goods.

By adding intermediary steps to the basic process of the present invention, extra space for printing such as mentioned in the preceding paragraph can be obtained. Such additional intermediary steps are firstly to remove the entire release paper from said label stock at a step preceding the step of conveying the label stock toward the printer and convey the release paper and the face paper temporarily on separate tracks and secondary to print a label message different from said label messages on the back of the face paper on one side using a pre-printer which is different from the printer mentioned earlier. The face paper thus printed with label message on its back will be superimposed and bonded again with the release paper which has been conveyed on a separate conveyer line at a position upstream of the printer. The label stock thus superimposed and bonded will then be subjected to printing of the label messages on its top face as mentioned above.

The present invention process for preparing self-adhesive multilayered label is by far more efficient than the prior art processes because the main and supplementary label messages are simultaneously printed on one sheet of label stock using one printer, and further because these face papers printed with label messages are later superimposed and bonded with each other.

BRIEF DESCRIPTION OF THE DRAWINGS

Other objects and advantages of this invention will become apparent when taken in conjunction with the description herein below of an embodiment shown in the accompanying drawings, in which.

DETAILED DESCRIPTION OF THE PREFERRED EMBODIMENT

Figure 1:
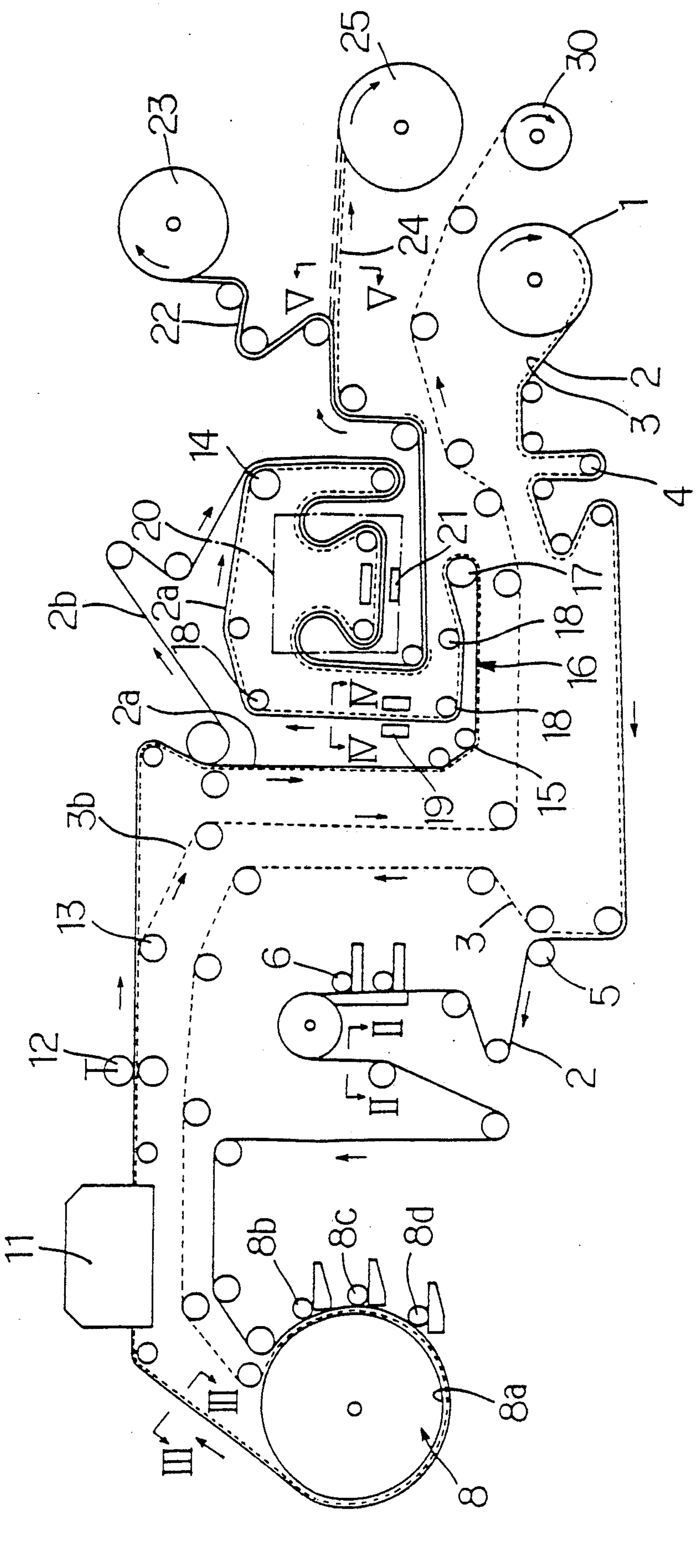
FIG. 1 is a side view of the paper feed line to explain the process for manufacturing composite self-adhesive labels according to the present invention.
Figure 2:
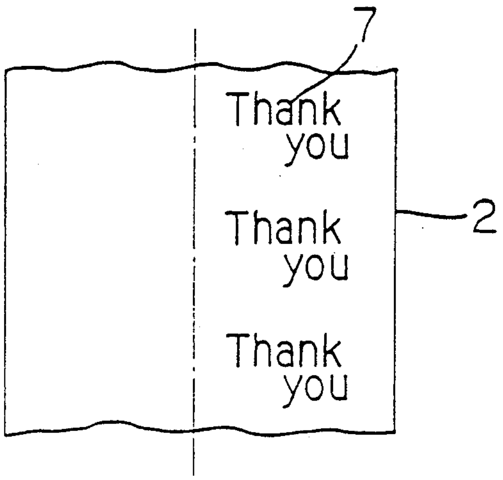
FIG. 2 is a plan view to show a label stock at the position indicated by the line II—II in FIG. 1.
Figure 3:
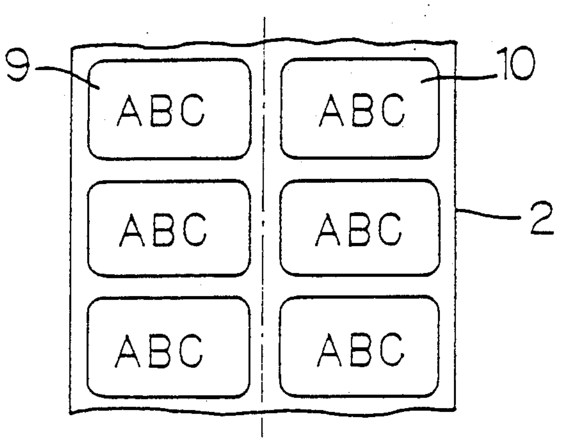
FIG. 3 is a plan view to show the label stock at the position indicated by the line III—III in FIG. 1.

FIG. 1 shows the entire steps of the paper feed line for the process according to the present invention. The reference numeral 1 denotes a roll of a label stock having sufficient width to allow both the main label message 9 and the supplementary label message 10 to be printed in parallel, as shown in FIG. 3. The label stock comprises a face paper 2 placed on the surface of a release paper 3. The label stock is conveyed to a separating section 5 located at the lower center via a tension roller unit 4. The face paper and the release paper are temporarily separated from each other at the separating section 5. The face paper 2 in this state is then sent to a pre-printer 6, where label message 7 with description to be used as a coupon, etc. is printed at a given interval on one side on its back as shown in FIG. 2. The face paper 2 is further conveyed to a main printer 8 where the main label message is to be printed thereon. In the meantime, the release paper 3 which was peeled off from the face paper 2 at the separating section 5 has been conveyed to a position above the main printer 8, where the face paper 2 will be placed on the surface of the release paper once again on the drum roll 8*a* of the printer 8.

The printer 8 is provided with plural printing rollers 8*b*, 8*c* and 8*d* on the outer periphery of the drum roll 8*a*. As the face paper 2 thus bonded with the release paper 3 is wound up by the drum roll 8*a*, two rows of label messages 9 (main) and 10 (supplementary) are simultaneously printed thereon in a parallel arrangement as shown in FIG. 3. It will be so arranged that the label message 7 printed by the pre-printer 6 will appear on the back of the supplementary label message 10 when these label messages 9 and 10 are to be printed.

After the face paper 2 is printed with the main and supplementary label messages 9 and 10 respectively by the printer 8 and then dried on its printed surface with a drier 11, the label stock comprising the face paper 2 and the release paper 3 bonded together is cut lengthwise into equal halves at the center between the main and the supplementary label messages by a slitter 12. One half of the label stock carrying the supplementary label message 10 is peeled off its release paper 3*b* at a separating section 13. The release paper 3*b* is sent toward a wind-up roller 30 located at the right in the figure to be rolled and discarded. The face paper 2*b* carrying the supplementary label message 10 and peeled off its release paper 3*b* has been already forwarded toward a pasting unit 14 by the time.

Figure 4:
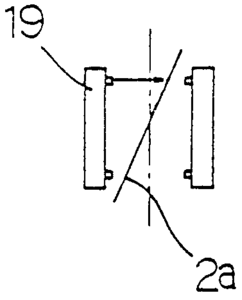
FIG. 4 is a sectional view to show the label stock at the position indicated by the line IV—IV in FIG. 1.
Figure 5:
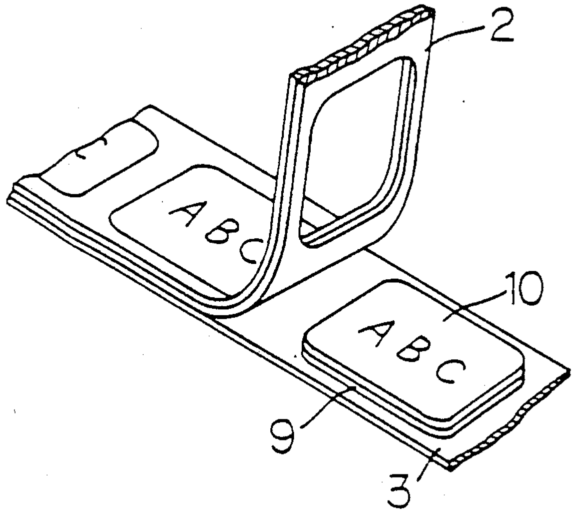
FIG. 5 is a perspective view to show the label stock at the position indicated by the line V—V in FIG. 1.

On the other hand, the other half of the label stock with its face paper 2*a* carrying the main label message 9 as well as with the release paper 3 is sent in the direction toward a by-pass 15 which is provided with an adjustment means 16 for the feed track and which is located at a lower portion of the figure. The feed track adjustment means 16 comprises plural adjustment rollers 18 whose axes are gradually slanted from each other and which are located downstream of a turn roller 17 at the terminal end of the by-pass 15, and a wave guide 19 which is located in between the rollers and which blows air against the inclined face paper 2*a* at one side. As air is blown against the face paper 2*a* carrying the main label message 9 by means of the wave guide 19 of the feed track adjustment means 16 in the by-pass 15, said face paper 2 will deviate from its normal track as indicated by the dotted line in FIG. 4 to follow an inclined track as indicated by the solid line. The inclination of the paper 2*a* is fixed by the subsequent adjustment rollers 18, so that its track comes in perfect alignment with the track of the face paper 2 carrying the supplementary label message before they reach the pasting unit 14.

After the feed track of the face paper 2 carrying the main label message 9 is aligned with the conveyer line of the face paper 2*b* carrying the supplementary label message 10, the face paper 2 carrying the supplementary label message 10 is placed over the face paper 2*a* carrying the main label message 9 at the pasting section 14. The speeds of the conveyer lines for respective tracks are adjusted so as to ensure perfact registration of the main label message 9 on the face paper 2*a* with the supplementary label message 10 on the face paper 2*b*. Since the travelling distance of the face ppaer 2*b* after stripping of its release paper to the pasting section 14 is shorter than that of the face paper 2*a* which makes a detour via the bypass 15, the paste on its back is not dried up so much, and firm pasting of the face papers 2*a* and 2*b* is assured.

The label stock comprising the face papers 2*a* and 2*b* thus pasted at the pasting section 14 is conveyed to a punch press machine 20, where a given contour framing the label message is punch-pressed on the label stock by means of a punching machine 21.

As the final step, the label stock 24 whose face papers 2*a* and 2*b* having been thus punch-pressed is stripped of blank portions 22 on the face paper surrounding the label messages off the release paper 3 and is wound up by a roller 23. The final product label stock 24 comprising two pasted face papers carrying the main and supplementary label messages 9 and 10 on the release paper is wound up by a roller 25.

Multi-layered self-adhesive label obtained by the steps as mentioned above and carrying the main and supplementary label message may be attached to the container of a product. A customer may recognize the supplementary label message on the top as he/she buys the product. The supplementary label message may be peeled off and used as a coupon after purchase. If the face paper with the supplementary label message is recovered by the shop, it will function as a coupon. In such a case, said descriptions to the effect of a coupon as mentioned with respect to the embodiment may not be necessary. Although the main and supplementary messages are the same in the foregoing embodiment, they may be different.

What is claimed is:

1. A method of manufacturing self-adhesive multilayered labels, comprising the steps of:

supplying an elongated label stock of a predetermined width sufficient to print plural messages widthwise thereon in parallel to each other, to a printer, said label stock having a release paper thereon and including a face paper portion;

printing plural messages in at least two parallel rows on the face paper portion of said label stock;

cutting the label stock into halves lengthwise between said at least two parallel rows of the messages on a conveyer line;

peeling off a release paper from one half of the cut label stock and forwarding the face paper portion thereof along the conveyor line, and discarding the peeled off release paper;

forwarding the other half of the cut label stock with its release paper still on;

conveying either one of said face paper portion or said label stock to a feed track adjustment means which is provided on the conveyor line to adjust the feed track of the conveyor line so that said face paper portion and said label stock are aligned with each other on substantially the same line;

superposing said face paper portion without said release paper thereon upon said aligned label stock with the release paper thereon and bonding the two together; and punching the thus bonded superposed papers into a contour framing the messages printed thereon.

2. The method of claim 1, further comprising:

removing the release paper temporarily from said face paper portion prior to feeding the label stock to the printer;

printing a message of letters or graphics on the back of said face paper portion in advance by a separate printer provided upstream of said label printer; and superposing said face paper portion on the temporarily removed release paper again before feeding the same to said label printer.

3. The method of claim 2, further comprising providing a wave guide on the conveyer line as at least a portion of said feed track adjustment means, and comprising adjusting the track of either one of said face paper portion without the release paper thereon or said label stock with the release paper thereon so as to align said face paper portion and said label stock with each other.

4. The method of claim 3, wherein said wave guide comprises an air blowing means, the method further comprising blowing air via said an blowing means of said wave guide against a face paper portion to cause said face paper portion to deviate from its normal feed track on said conveyor line so as to cause said face paper portion to align with said label stock.

5. The method of claim 2, wherein said feed track adjustment means comprises a plurality of adjustment rollers whose axes are slanted relative to each other, and comprising adjusting the track of either one of said face paper portion without the release paper thereon or said label stock with the release paper thereon by varying the inclination of the axis of at least one of said adjustment rollers.

6. The method of claim 5, further comprising providing a wave guide on the conveyer line as at least a portion of said feed track adjustment means, and comprising adjusting the track of either one of said face paper portion without the release paper thereon or said label stock with the release paper thereon, by means of said wave guide, so as to align said face paper portion and said label stock with each other.

7. The method of claim 6, wherein said wave guide comprises an air blowing means, the method further comprising blowing air via said an blowing means of said wave guide against a face paper portion to cause said face paper portion to deviate from its normal feed track on said conveyor line so as to cause said face paper portion to align with said label stock.

8. The method of claim 1, further comprising providing a wave guide on the conveyer line as at least a portion of feed track adjustment means, and comprising adjusting the track of either one of said face paper portion without the release paper thereon or said label stock with the release paper thereon so as to align said face paper portion and said label stock with each other.

9. The method of claim 8, wherein said wave guide comprises an air blowing means, the method further comprising blowing air via said an blowing means of said wave guide against a face paper portion to cause said face paper portion to deviate from its normal feed track on said conveyor line so as to cause said face paper portion to align with said label stock.

10. The method of claim 1, wherein said feed track adjustment means comprises a plurality of adjustment rollers whose axes are slanted relative to each other, and comprising adjusting the track of either one of said face paper portion without the release paper thereon or said label stock with the release paper thereon by varying the inclination of the axis or at least one of said adjustment rollers.

11. The method of claim 10, further comprising providing a wave guide on the conveyer line as at least a portion of said feed track adjustment means, and comprising adjusting the track of either one of said face paper portion without the release paper thereon or said label stock with the release paper thereon, by means of said wave guide, so as to align said face paper portion and said label stock with each other.

12. The method of claim 11, wherein said wave guide comprises an air blowing means, the method further comprising blowing air via said an blowing means of said wave guide against a face paper portion to cause said face paper portion to deviate from its normal feed track on said conveyor line so as to cause said face paper portion to align with said label stock.

* * * * *